Figure 1:
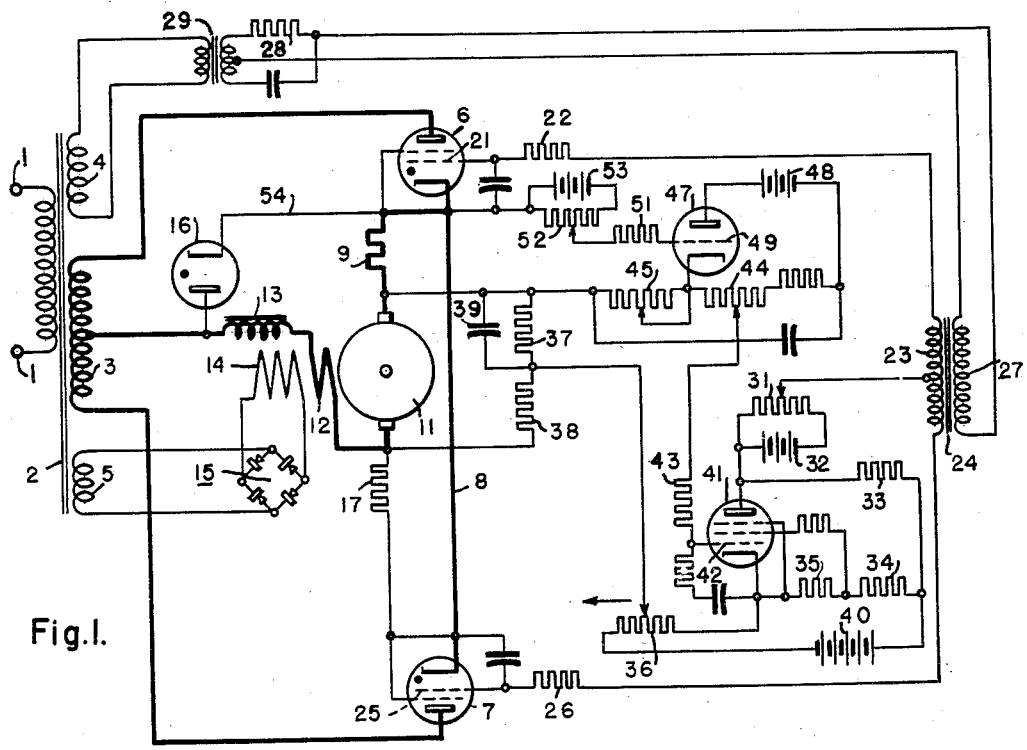

INVENTORS
Konstanty P. Puchlowski
& John G. Haneiko.

Patented Mar. 20, 1951

2,546,014

UNITED STATES PATENT OFFICE 2,546,014

ELECTRONIC SYSTEM FOR ENERGIZING DIRECT-CURRENT MOTORS FROM AN AL-TERNATING-CURRENT SOURCE

Konstanty P. Puchlowski, Buffalo, and John G. Haneiko, East Aurora, N. Y., assignors to Westinghouse Electric Corporation, East Pittsburgh, Pa., a corporation of Pennsylvania Application September 4, 1948, Serial No. 47,904

6 Claims. (Cl. 318—308)

Our invention relates to rectifier systems for energizing the armature of a direct-current motor by adjustable voltage from an alternating-current source, and it has for its main object to improve the form factor of the rectified motor current, i. e. to minimize the pulsations or the ripple of the current.

It is a well known fact that current obtained from an adjustable-voltage rectifier will have either a pulsating character or, if of continuous character, will still contain an appreciable A.-C. component. The frequency of current pulsations or of the A.-C. ripple is represented by the product of the A.-C. line frequency and the number of phases of the rectifier. In motor control systems of this kind, considerable A.-C. component in the load circuit, present even in polyphase rectifier systems, leads to: (1) increased losses in the motor (copper losses are increased in direct proportion to the square of the form factor of the armature current) resulting in increased size of the motor frame and decreased efficiency of the drive, (2) more difficult commutation of the motor, (3) additional vibrations in the motor, (4) additional noise produced by the motor, and (5) increased instantaneous peak currents in the rectifying elements.

Thus, there are good reasons for trying to reduce the A.-C. component, that is, the form factor ($I_{rms}/I_{dc}$) of the armature current as close to unity as possible. Particularly, in most applications of rectifier drives for grinders for finishing processes (spindle drives, feed drives), an elimination of all traces of vibrations is imperative.

It is well known that the filtering of armature current can be accomplished by means of a reactor connected in series with the armature. However, the effect of the filtering action of the reactor is limited by the fact that the E. M. F. of inductance of the reactor, which tends to maintain the flow of current as soon as the current in the pulse starts decreasing, has to overcome the opposing E. M. F. of the power transformer. In the case of a symmetrical 2-phase rectifier or even a 3-phase rectifier, the "defiltering" effect of the power transformer is considerable because the A.-C. component of current is normally high. Therefore, when accurate filtering is required, a very large reactor is necessary to filter out the objectionable ripple. Furthermore, an increase in inductance of a reactor is normally associated with an increase in resistance also, and it is, of course, undesirable to go too far in increasing the resistance of the armature circuit, because of the motor speed regulation problems.

It is, therefore, a more specific object of our invention to secure an efficient filtering action in the armature circuit of a control system of the above-mentioned kind that is capable of greatly improving the form factor of the rectified armature current by means of filtering equipment of simple design and relatively low cost, with only moderate filtering reactance involved.

In thyratron systems for controlling direct-current motors by adjustable rectified voltage from an alternating-current source, the critical point at which separate pulses of load current join is often accompanied by a phenomenon of a discontinuous and unstable firing of rectifier tubes and this, of course, may be very undesirable. This phenomenon is particularly noticeable at highly inductive loads and at higher anode supply voltages, and is caused by a sudden shift in the critical grid characteristic of the thyratron tubes. The discontinuity normally takes place in the case of inductive loads when a sinusoidal control grid voltage is applied to the thyratron grids. On the other hand, conduction with discrete current pulses in the armature is always encountered, regardless of the value of filtering inductance, when the current and the speed (E. M. F.) of the motor are low, which is often the case in adjustable rectifier drives. Discontinuous conduction in the load circuit of an adjustable rectifier takes place as soon as the firing angle of rectifier tubes is delayed beyond the so-called "critical angle of ignition," and this delay may be necessary to insure low speed and low load currents. Thus, the unstable and irregular transfer condition from discontinuous to continuous current normally takes place in rectifier-motor systems with wide range of speeds and loads even with a high value of filtering inductance in series with the motor armature.

It is, therefore, another object of the invention to minimize or eliminate the just-mentioned instability of rectifier ignition, thus improving the degree of speed constancy of the drive system, and the continuity and stability of its operation to make it better suitable for driving high-precision machinery such as precision grinders.

According to one of the essential features of the invention, we connect a reactor or inductive impedance in series with the armature of a direct-current motor energized through controllable rectifier tubes from a power transformer, and we connect a unidirectionally conductive low-impedance shunt circuit across the series-connected reactor and armature so that the current produced by the electromotive force of the series reactor flows through a loop formed by reactor, armature and shunt circuit and not through the power transformer.

According to another feature of the invention, we also connect a pre-loading resistor across the motor armature so that, for light loads of the motor, this resistor maintains a minimum current in the filtering reactor, sufficient to prevent the above-mentioned irregular transfer conditions from discontinuous to continuous current by maintaining continuous current in the load circuit over the entire range of operations of the system.

Figure 2:
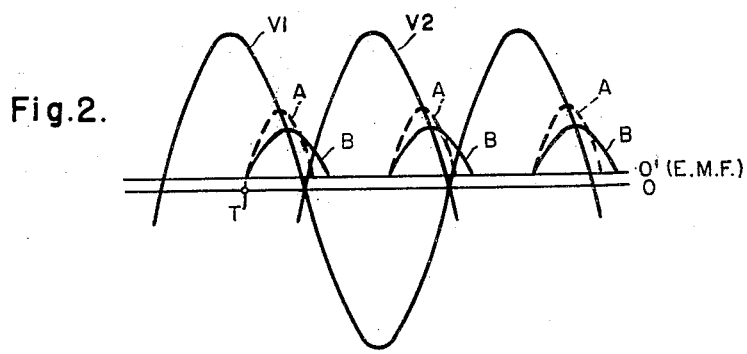
Figure 3:
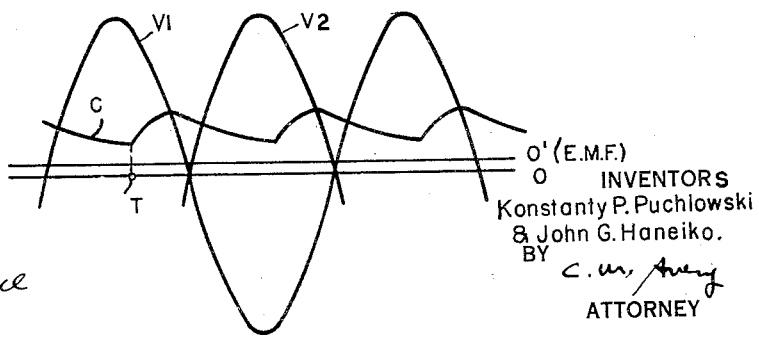

The drawing shows in Figure 1, the schematic circuit diagram of a motor control system exemplifying an embodiment of the invention while Figs. 2 and 3 are explanatory current-time and voltage-time diagrams comparing the performance of known systems (Fig. 2) with that of a system according to the invention (Fig. 3).

The alternating-current terminals 1 of the control system shown in Fig. 1 are connected to a main transformer 2 with three secondary windings 3, 4 and 5. The ends of secondary winding 3 are connected to the anodes of two respective rectifier tubes 6 and 7 of the gaseous or arc-discharge type, for instance, thyratrons. The two tubes have a common cathode lead 8 connected through a low ohmic series resistor 9 to the armature 11 of the direct-current motor to be energized and controlled. Armature 11 is connected through a series field winding 12 of the motor and in series with a filtering reactor 13 to the tapped mid-point of the secondary transformer winding 3. The main field winding 14 of the motor is separately excited by constant voltage from a rectifier 15 energized by the secondary winding 5 of transformer 2. An electronic (or junction type) valve 16 is connected in a circuit in parallel with the series connection of resistor 9, armature 11, field winding 12 and reactor 13. A pre-loading resistor 17 is connected in parallel relation to the armature 11 and resistor 9.

The rectifier tubes 6 and 7 conduct current in respective successive half cycles of the alternating current, and thus provide full-wave rectification for the armature circuit of the motor. The magnitude of the rectified voltage depends upon the firing point or firing angle of tubes 6 and 7, i. e., upon the instant relative to the conductive half-cycle period of each tube. This firing angle is controlled by respective control circuits. The control circuit for tube 6 extends from the control electrode or grid 21 through a resistor 22 to one end of the secondary winding 23 of a transformer 24. The control circuit for tube 7 extends from the appertaining control electrode or grid 25 through a resistor 26 to the other end of the secondary winding 23. The primary 27 of transformer 24 is connected through a phase-shift circuit 28 and an appertaining phase-shift transformer 29 to the secondary winding 4 of the main transformer 2. Transformer 24 impresses on the control grids of rectifier tubes 6 and 7 an alternating component control voltage whose phase lags about 90° behind the anode supply voltage of the respective rectifier tubes.

The rectifier control circuits have a common portion which extends from a midtap of transformer secondary 23 through an adjustable portion of a potentiometer rheostat 31 which is connected across a direct-current source of constant voltage schematically represented at 32. From potentiometer rheostat 31, the common portion of the tube control circuits extends through resistors 33, 34 and 35, and a portion of a potentiometer rheostat 36 to a resistor 37 which is connected across the motor armature 11 in series with a resistor 38. A filtering capacitor 39 lies in parallel to resistor 37. From resistor 37, the common portion of the tube control circuits extends through the series resistor 9 to the common cathode lead 8 of tubes 6 and 7.

Aside from the above-mentioned alternating component of control voltage impressed on the control circuits for tubes 6 and 7, two direct-voltage components are impressed on these circuits. One direct-voltage component consists of the constant voltage across the active portion of potentiometer 31 and the constant voltage across resistors 35 and 34 obtained from a direct-current source schematically indicated at 40. The other direct-voltage component is impressed on the tube control circuits from across the resistor 33. This latter component is variable and its value determines the firing angle of the rectifier tubes and, hence, the voltage applied to the motor armature circuit.

Resistor 33 is series connected in the plate circuit of the master control tube 41 which is a vacuum tube such as a pentode, and is plate-energized from across the resistors 34 and 35. The plate voltage across these resistors is obtained from source 40 and is constant. The voltage drop across the load resistor 33, however, depends upon the conductivity of the master control tube 41. When tube 41 is fully conductive, and therefore the voltage drop across the resistor 33 a maximum, the rectifier tubes 6 and 7 have zero conductance. When the conductivity of the master control tube is sufficiently reduced, the firing angle of thyratrons 6 and 7 is fully advanced so that a maximum voltage is applied to motor armature.

The conductivity of master control tube 41 is controlled by the appertaining grid circuit which can be traced from the grid 42 through a resistor 43, a portion of a resistor 44, a rheostat 45, the resistor 37, and a portion of the rheostat 36 to the cathode of tube 41.

The rheostat 36 impresses on the grid circuit an adjustable direct-voltage which represents the reference voltage of the regulating system and determines the speed at which the motor is to run. The resistors 37 and 38 across the armature 11 form together a voltage divider so that resistor 37 impresses a voltage on the grid circuit of tube 41 in proportion to the armature voltage of the motor. This voltage is series opposed to the adjusted constant reference voltage from the speed control rheostat 36. When the motor is running at a certain speed, the voltage across the active portion of the speed control rheostat 36 and the opposing voltage across resistor 37 are balanced against each other in such a way that a resultant negative voltage of a few volts is applied to the control grid of tube 41. The resultant grid voltage corresponds to a definite amplified voltage across resistor 33 and thus to a definite firing angle of thyratrons 6 and 7. If the slider of rheostat 36 is moved away from the cathode of tube 41, this balance is momentarily disturbed. The control grid of tube 41 becomes more negative and the voltage across resistor 33 decreases, thus advancing the firing point of the thyratrons. This results in an increase in armature voltage and motor speed, and, obviously, in an increase in voltage across resistor 37. The increase is such that a new balance of the system is established at a slightly more negative resultant grid voltage of tube 41. Conversely, the speed of the motor is decreased when the slider of rheostat 36 is moved toward the cathode of tube 41. However, since the armature voltage of a motor of this type is not an accurate indication of the motor speed, but increases more than in proportion to the speed when the torque of the motor and hence the motor current and the IR drop in the armature circuit increase, a corrective control of the grid circuit for control tube 41 is necessary in order to establish a sufficiently accurate correspondence between the setting of rheostat 36 and motor speed, regardless of variations in motor load.

To this end, the portion of resistor 44 which is active in the grid circuit of control tube 41 is connected in the plate circuit of an amplifier tube 47 such as a vacuum triode. The plate circuit is energized from a direct-current source of constant voltage schematically represented at 48. The voltage drop across resistor 44 depends upon the conductivity of tube 47. This conductivity is controlled by a grid circuit which extends from the grid 49 of tube 47 through a resistor 51 and through a portion of a resistor 52 connected across a constant voltage source shown at 53. The grid circuit further extends through the series resistor 9 of the armature circuit and through the rheostat 45 to the cathode of amplifier tube 47.

The just-mentioned grid circuit of tube 47 includes two series-connected sources of component grid voltages. One source consists of the active portion of resistor 52 and provides an adjusted constant negative grid bias. The other source consists of the series resistor 9 which impresses on the grid circuit a voltage in proportion to the current flowing through the armature circuit, and hence in proportion to the IR drop of the armature circuit. When the IR drop increases, for instance due to an increase in motor load or torque, the tube 47 becomes increasingly conductive and the voltage across resistor 44 is increased. The polarity of the voltage across resistor 44 with respect to the grid of tube 41 is the same as that of the voltage across rheostat 36. In this manner the resultant grid voltage on tube 41 is corrected to compensate for variations in motor speed due to changes in IR drop.

In the above-described system of Fig. 1, the valve 16 with the connecting lead 54 represents a unidirectionally conductive low impedance circuit across the series connection of the resistor 9, the motor armature 11 and the filtering reactor 13. The function of this low-impedance loop circuit will be explained with reference to Figures 2 and 3.

In Figs. 2 and 3, the abscissa 0 represents the time axis of the diagram. Graphs V1 and V2 denote the alternating anode voltage applied from the two portions of secondary winding 3 to the rectifier tubes 6 and 7. Graphs A, B and C represent (in a different scale) the IR drop in the armature circuit or the current flowing through the armature.

Graphs A, B and C are shown for low motor speed and low load, that is for an operating condition where the rectifier tubes conduct only during a small portion of their respective half-cycle periods. Under such conditions, the form factor of the rectified armature current is especially high, i. e. the A.-C. component of the rectified unidirectional armature current is much higher with respect to D.-C. component of current than under other conditions.

For the purpose of explanation let us first assume that the control system neither contains the filtering reactor 13 nor the shunt circuit with valve 16. If in such a system the armature circuit were of a purely resistive character, the current in the armature at the instant of ignition of either rectifier tube would immediately rise from zero to the instantaneous value producing an instantaneous IR drop equal to the difference between the instantaneous value of the anode voltage at the instant (T) of ignition and the E. M. F. of the motor. Then the graph of the IR drop would follow the anode voltage up to the point where that voltage intercepts the straight line O' of the motor E. M. F. At that particular point, the current I will become equal to zero since, at that point, the voltage causing the flow of current is equal to zero.

However, the armature winding always has an inductance in addition to the resistance. Consequently, the graph of the current pulse will be as schematically represented by graph A in Fig. 2. The current is carried beyond the point of resistance extinction, against the opposing E. M. F. and a portion of the negative half cycle of the transformer voltage.

Assuming now that the system is modified only by adding a filtering reactor in series with the armature, the E. M. F. of inductance will be increased and the current will be carried still further beyond the point of resistive extinction. The current or IR drop in that case is typified by graph B in Fig. 2. It will be noted again that the decreasing current maintained by the inductance E. M. F. of the reactor and armature flows through half of the transformer winding 3 against the opposing transformer voltage.

Referring now to the system which according to the invention contains a filtering reactor 13 as well as a low impedance path with valve 16 in shunt connection to armature 11 and reactor 13, it will be recognized that the current sustaining action of the reactor is greatly increased because now the E. M. F. of inductance of the reactor, which for decreasing current, tends to maintain the flow of current, acts through the low impedance path of the valve 16, rather than through the transformer winding in opposition to the secondary transformer voltage. Consequently, the discharge valve 16 starts conducting as soon as the rate of decrease of the current in one rectifier tube becomes sufficiently high, and normally keeps on carrying current through the motor armature until the incoming, other rectifier tube picks up. This leads to a current of a continuous character as schematically represented by graph C in Fig. 3.

A comparison of graph C with graphs A and B shows that in a system according to the invention, the filtering effect is considerably increased particularly at low motor speeds. This is important because normally the most effective filtering action is desirable at low motor speeds where the form factor of the armature current has the highest value and thus causes the most noticeable noise and vibrations.

The pre-loading resistor 17 connected across the armature 11 insures a certain minimum load current in the filtering reactor 13, especially at no-load operation of the motor. As a result, continuous conduction of current is obtained over the entire range of loads and speeds and the above-mentioned irregular transfer conditions from discontinuous to continuous current cannot take place.

It should be understood that the system shown on the drawing and described above represents only one of the many ways in which the present invention can be reduced to practice and, for facility of explanation and understanding, does not include various protective and other auxiliary components that are usually desirable but well known as such and not related to the invention proper. For instance, current limiting control means may be added in order to prevent overloads damaging to the rectifier tubes and control the acceleration of the motor. However, the illustrated system, as far as the invention is concerned, operates in the same above-explained manner regardless of the presence or absence of current limit control; and excessive overloads during starting and stopping periods are also avoided if the motor in the illustrated system is started by gradually moving the slider of speed control rheostat 36 away from the cathode of tube T4 and is stopped by gradually moving the slider toward the cathode.

It will be obvious to those skilled in the art upon a study of this disclosure, systems according to the invention can be altered and modified in various respects without departing from the objects, advantages, and essential features of the invention and within the scope of the claims annexed hereto.

We claim as our invention:

1. An electronic system for energizing a direct-current motor from an alternating current source, comprising a power transformer, a rotary direct-current motor having an armature, rectifier tubes connected between said armature and said transformer for sequentially conducting rectified current through said armature, an inductive reactor series-connected with said armature, a shunt circuit having low impedance compared with said transformer and being connected across said series-connected armature and reactor, said shunt circuit having a valve poled for permitting the inductive current from said reactor to flow through said armature only in the direction of said rectified current.

2. An electronic system for energizing a direct-current motor from an alternating current source, comprising a power transformer, a rotary direct-current motor having an armature, rectifier tubes connected between said armature and said transformer for sequentially conducting rectified current through said armature, an inductive reactor series-connected with said armature, a shunt circuit having low impedance compared with said transformer and being connected across said series-connected armature and reactor, said shunt circuit having a valve poled for permitting the inductive current from said reactor to flow through said armature only in the direction of said rectified current, and a resistor connected parallel to said armature and in series with said reactor to provide pre-loading current for said reactor.

3. An electronic system for energizing a direct-current motor from an alternating current source, comprising a power transformer, a direct-current motor having an armature, controllable rectifier tubes connected between said armature and said transformer for sequentially conducting rectified current through said armature, said tubes having a control circuit for varying said rectified current in dependence upon control voltage, circuit means connected with said control circuit for supplying said voltage, said circuit means being connected to said armature for controlling said voltage in dependence upon a condition of said current, an inductive reactor connected in series with said armature to be traversed by said current, and a shunt circuit having low impedance compared with said transformer and being connected across said series-connected armature and reactor, said shunt circuit having a valve poled for permitting the inductive current from said reactor to flow through said armature while blocking the flow of rectified current through said shunt circuit.

4. An electronic system for energizing a direct-current motor from an alternating current source, comprising a power transformer, a direct-current motor having an armature, controllable rectifier tubes connected between said armature and said transformer for sequentially conducting rectified current through said armature, said tubes having a control circuit for varying said rectified current in dependence upon control voltage, circuit means connected with said control circuit for supplying said voltage, said circuit means being series-connected with said armature for controlling said voltage in dependence upon a condition of said current, an inductive reactor connected in series with said armature to be traversed by said current, and a shunt circuit having low impedance compared with said transformer and being connected across said series-connected armature and reactor and circuit means, said shunt circuit having a valve poled to block said rectified current, and a resistor connected parallel to said armature and in series with said reactor to provide pre-loading current for said reactor.

5. An electronic system for energizing a direct-current load from an alternating current source, comprising controllable rectifier tubes connected between said load and said transformer so as to provide full-wave rectified current for said load, an inductive reactor series-connected with said load, a valve circuit having low impedance compared with said transformer and being connected across said series-connected load and reactor and being poled to be blocked for said rectified current, and a resistor connected parallel to said load and having high resistance compared with said load.

6. An electronic system for energizing a direct-current load from an alternating current source, comprising controllable rectifier tubes connected between said load and said transformer so as to provide full-wave rectified current for said load, said tubes having a control circuit for varying said rectified current in dependence upon control voltage, circuit means connected with said control circuit for supplying said voltage, said circuit means being connected to said load for controlling said voltage in dependence upon an electric condition of said load caused by said current, an inductive reactor series-connected with said load, a valve circuit having low impedance compared with said transformer and being connected across said load and reactor and circuit means, said valve circuit being poled to be blocked for said rectified current.

KONSTANTY P. PUCHLOWSKI.
JOHN G. HANEIKO.

REFERENCES CITED

The following references are of record in the file of this patent:

UNITED STATES PATENTS

| Number | Name | Date |
|---|---|---|
| 1,928,812 | Dawson | Oct. 3, 1933 |
| 2,259,958 | Levy | Oct. 21, 1941 |
| 2,422,567 | Puchlowski | June 17, 1947 |